July 5, 1966  R. D. HULL  3,259,333
LINE PICK-UP MEANS FOR CLOSED FACE SPINNING REEL
Filed March 11, 1964  4 Sheets-Sheet 1
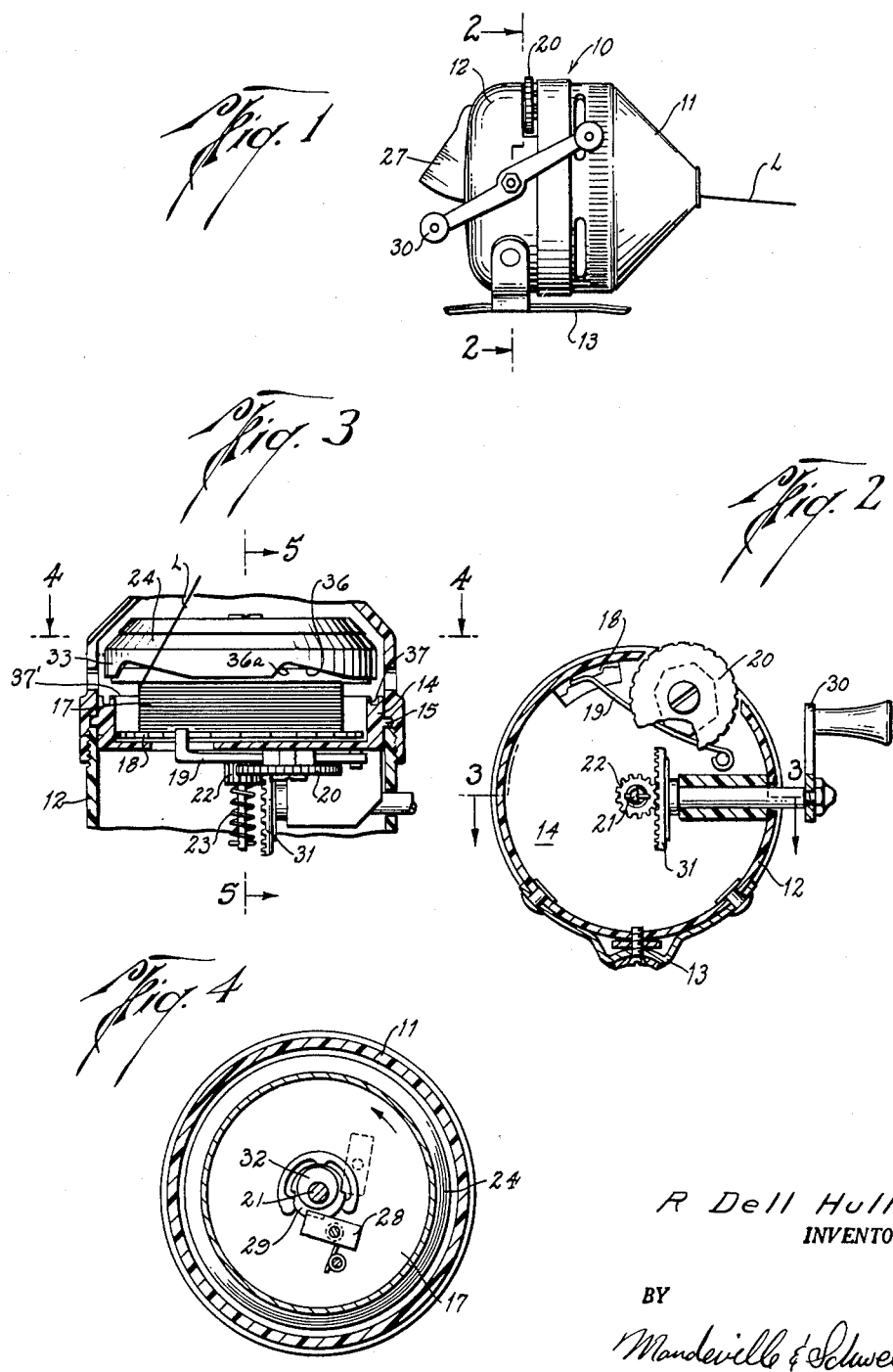
R Dell Hull
INVENTOR.
BY
Mandeville & Schweitzer
ATTORNEYS

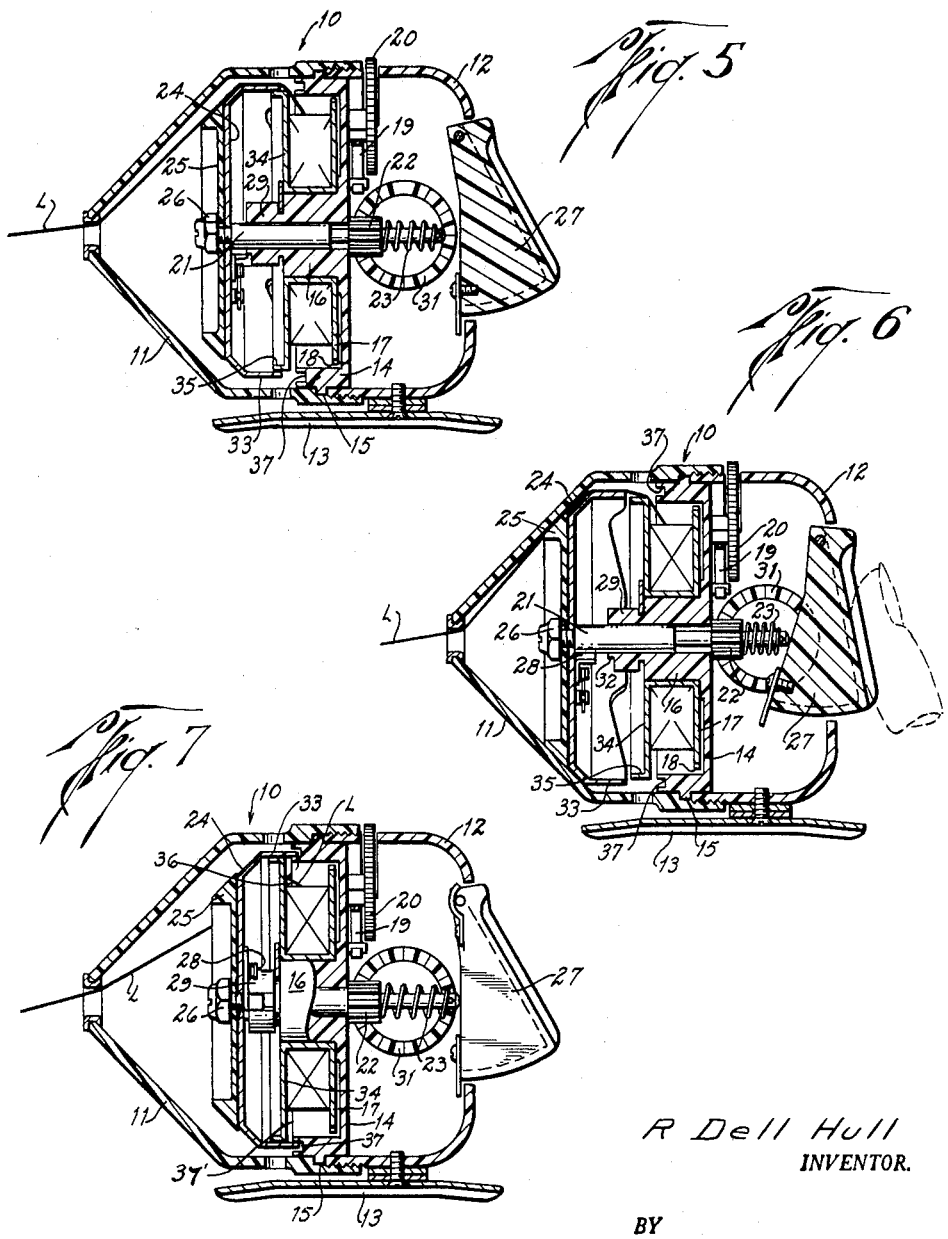

July 5, 1966  R. D. HULL  3,259,333
LINE PICK-UP MEANS FOR CLOSED FACE SPINNING REEL
Filed March 11, 1964  4 Sheets-Sheet 3
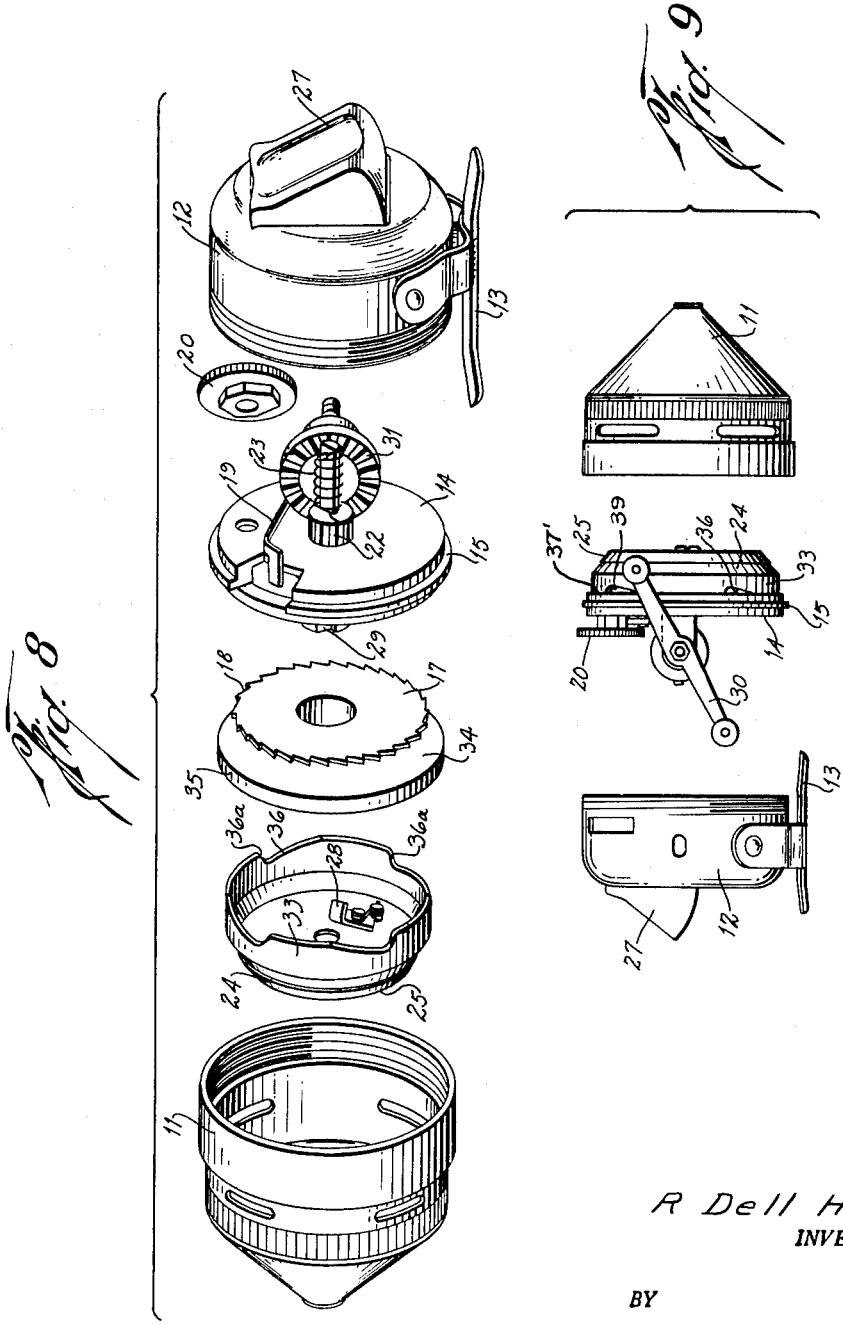
R Dell Hull
INVENTOR.
BY
Mandeville & Schweitzer
ATTORNEYS July 5, 1966 R. D. HULL 3,259,333
LINE PICK-UP MEANS FOR CLOSED FACE SPINNING REEL
Filed March 11, 1964 4 Sheets-Sheet 4
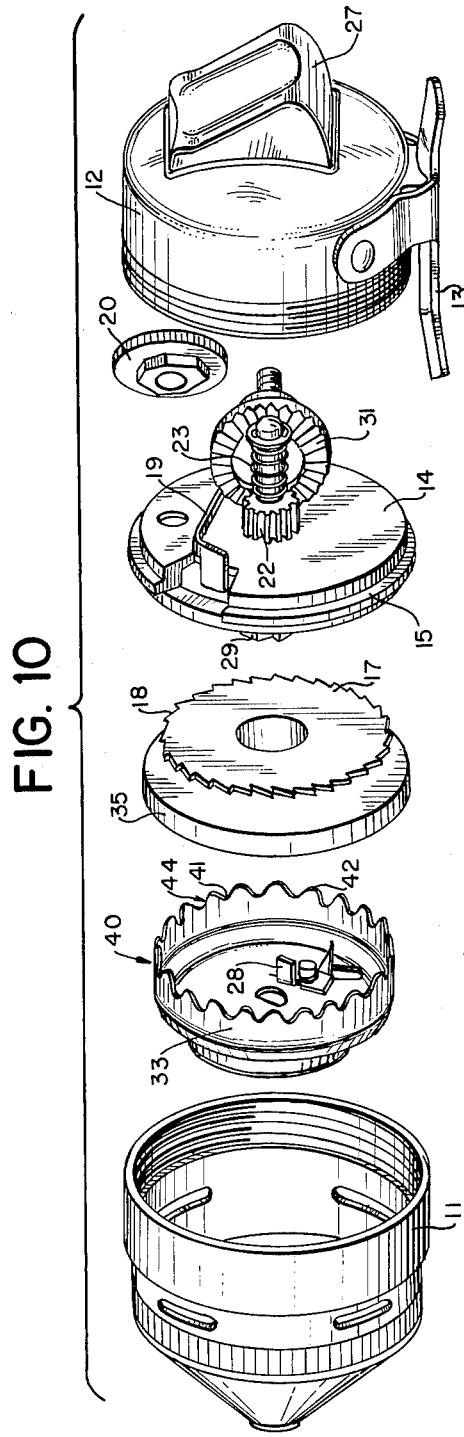
FIG. 10
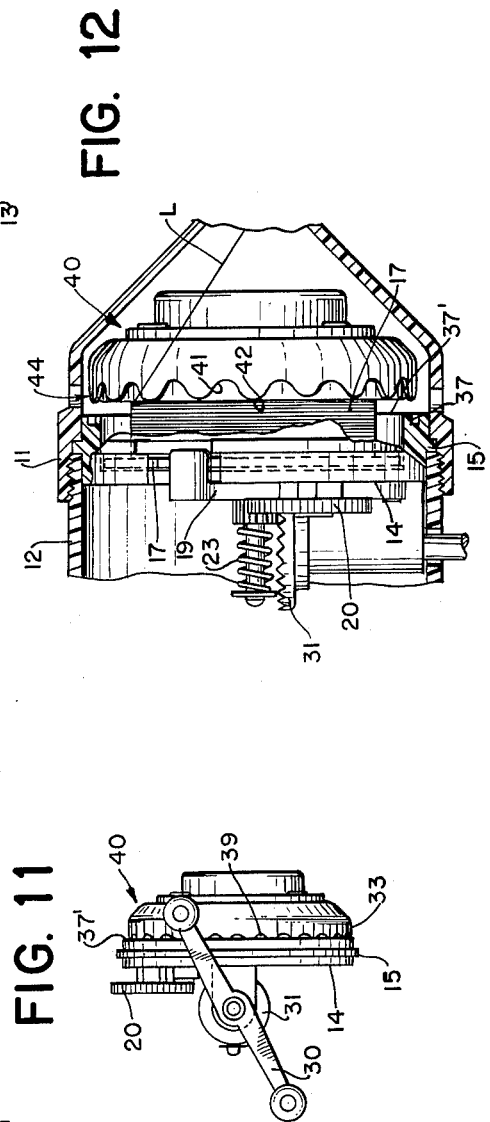
FIG. 12
FIG. 11
INVENTOR.
R. DELL HULL
BY
Mandeville and Schweitzer
ATTORNEYS

United States Patent Office 3,259,333
Patented July 5, 1966

3,259,333
LINE PICK-UP MEANS FOR CLOSED FACE
SPINNING REEL
R. Dell Hull, 1131 E. Easton St., Tulsa, Okla.
Filed Mar. 11, 1964, Ser. No. 351,014
11 Claims. (Cl. 242—84.2)

This application is a continuation-in-part of my copending application Serial No. 239,167, filed November 21, 1962, for "Line Pick-Up Means for Closed Face Spinning Reel," now abandoned, which is a division of application Serial No. 86,049, filed January 31, 1961, now United States Patent No. 3,105,651.

The present invention is directed to closed face spinning reels and, more specifically, to the provision of novel and more effective line pick-up means for a closed face spinning reel.

In a typical closed face spinning reel, a line-containing spool is mounted within an enclosed housing, and a pick-up head is mounted for rotation in front of the line spool. The line, in passing off the spool, travels over the outer periphery of the pick-up head and out through a central, forward opening in the reel housing or casing. To retrieve the line, means are provided on the pick-up head for engaging the line while the pick-up head is being rotated, whereby the line is carried around with the pick-up head and thereby wound upon the normally non-rotatable spool.

In the past, it has been conventional to employ various types of retractable pick-up fingers which, through various manipulations of the reel mechanism, can be retracted to permit payout of the line during casting, and can be projected outward to engage the line for rewinding. While these arrangements have been generally satisfactory, their use adds to the complexity of the reel mechanism, since facilities must be provided for movably mounting and actuating the pins. Accordingly, it has also been suggested in the past to employ a notched pick-up head, so arranged that, when the pick-up head is in winding position, the line is engaged by a notch in the rearward edge of the pick-up head and wound upon a spool as the pick-up head revolves.

While the use of a notched pick-up head for line retrieval has represented a desirable ideal, as far as simplicity and economy of reel construction is concerned, prior reels which utilize a notched pick-up head for line retrieval have been relatively unsuccessful due to problems, in the wind-up and/or casting of the line, traceable directly to the notched pick-up head. This shortcoming, I have discovered, was due to the fact that conventional notched pick-up head arrangements, if they satisfactorily engage the line for rewinding, interfere with the line during payout. On the other hand, if the notched pick-up head is so designed as to permit free and unimpeded payout of the line during casting, difficulties are experienced in the wind-up phase.

In accordance with the invention, a novel and improved closed face spinning reel is provided which incorporates a notched pick-up head for line retrieval and which incorporates specifically novel features of construction rendering the notched pick-up head efficient during both the wind-up and payout phases of reel operation. The improvement of the invention, while deceivingly simple in its structure, represents in fact a major advance in reel construction in that, for the first time, it permits the truly effective use of a notched pick-up head. The use of a notched pick-up head, in place of retractable pick-up pins and actuating mechanisms therefor, represents a very significant simplification of the reel mechanism and enables a drastic reduction in the cost of the reel to be realized.

Specifically, my invention involves the recognition that the line, in passing over the pick-up head during payout, will tend to snag in line pick-up notches, unless those notches are so designed as to be substantially self-clearing. At the same time, design of the notches to be self-clearing renders them, by themselves, inefficient for line retrieval. In accordance with the invention, therefore, auxiliary means, cooperating with the self-clearing notches of the pick-up head, reliably assure that the line remains engaged in the notches during line retrieval.

More specifically, the improvement of the invention resides in the provision, in a closed face spinning reel of the type having an axially movable pick-up head, of a novel line pick-up arrangement comprising one or more line-engaging notches in the rearward edge of the pick-up head, the notches having line-engaging surfaces disposed at a substantial receding angle to the longitudinal axis of the pick-up head. In conjunction with the foregoing, the frame of the reel is provided with a forwardly facing annular guide groove positioned to receive the rearward edge of the pick-up head, when the head is moved axially rearward to line retrieving position, the pick-up head being received to a depth less than that of the line-engaging notches. The specific, advantageous arrangement is such that the line-engaging notches, having receding surfaces for line engagement, such as to have a tendency to be self-clearing, are completely closed off during wind-up so that the line is literally trapped within the notch and contained therein as the pick-up head rotates. At the same time, the self-clearing aspects of the pick-up head notches provide for smooth payout of the line during casting, without any tendency to snag prematurely in line-engaging notches.

In accordance with a more specific aspect of the invention, the pick-up head may be provided with a continuous, or endless, sinuously scalloped rearward edge defining a relatively large number of self-clearing notches. This specific design enables great savings in manufacturing costs to be realized, in addition to contributing significantly to an increase in the efficiency and reliability of operation of the assembled spinning reel.

The provision of self-clearing line-engaging notches in the pick-up head, in combination with a forwardly facing guide groove in the reel frame, provides for the first time a notched pick-up head arrangement which is effective during both wind-up and payout of the line. This arrangement, for the first time, enables a wholly practical closed face spinning reel to be made without the provision of a retractable pick-up pin or finger, resulting in drastic reductions in the cost of manufacturing a reliably operable reel.

For a better understanding of the invention, reference should be made to the following detailed specification and to the accompanying drawings, in which:

FIG. 1 is a side elevational view of a closed face spinning reel incorporating the features of the invention;

FIG. 2 is a transverse cross-sectional view taken generally along line 2—2 of FIG. 1;

FIG. 3 is a top, partially sectional view taken generally along line 3—3 of FIG. 2;

FIG. 4 is a transverse sectional view taken generally along line 4—4 of FIG. 3;

FIGS. 5, 6, and 7 are various transverse sectional views, taken generally along line 5—5 of FIG. 3, showing the parts of the reel at different stages of the operation thereof;

FIG. 8 is an exploded perspective view of the entire reel structure;

FIG. 9 is an exploded elevational view of the principal sub-assembled components of the complete reel assembly;

FIG. 10 is an exploded perspective view of a modified reel structure;

FIG. 11 is a side elevational view of a modified reel sub-assembly; and

FIG. 12 is a top, partially sectional view of a modified reel structure.

Referring now to the drawings, and initially to FIGS. 1, 8, and 9 thereof, there is shown a reel including a casing generally designated by the numeral 10, comprising a front cover 11 and a rear cover 12 joined by a threaded connection. A tang 13 is suitably secured to the rear cover 12 for mounting the reel assembly upon a rod in a conventional manner.

Internally, the reel includes a mechanism sub-assembly mounted on a frame plate 14, which is clamped securely between the front and rear covers by means of a flange 15, as described in detail and claimed in my application Serial No. 86,049, now United States Patent No. 3,105,651.

The frame plate 14 includes a hub 16 (FIGS. 5–7) on which is mounted a line spool 17, the line spool being normally stationary but being controllably rotatable through a drag brake assembly comprising a ratchet surface 18, a spring pawl 19, and a control cam 20 which is manually rotatable to apply varied tensions or stresses to the spring 19.

Internally, the hub 16 journals a wind-up shaft 21, which is slidable axially in the hub and slidably engages a drive pinion 22 on its rearward end portion. A spring 23 acts on the drive pinion and constantly urges the wind-up shaft 21 in the rearward direction. The forward end of the wind-up shaft 21 is threaded to receive a pick-up head 24, a frusto-conical brake ring 25, and a securing nut 26 which serves to make the pick-up head and brake ring rigid with the wind-up shaft, usually in conjunction with a suitable flat or key arrangement to maintain the shaft 21 and pick-up head 24 non-rotatable independently of the nut 26.

A thumb control lever 27 is pivoted on the rear casing member 12 and serves, when depressed by the thumb, to urge the wind-up shaft 21 and pick-up head 24 forward, against the restraining action of spring 23. A spring actuated lever 28 thereupon swings in front of a hub extension 29 so that, when the thumb pressure is released from the lever 27, the pick-up head remains locked in its forward position. However, when the pick-up head is rotated, by a winding handle 30 and drive gear 31, the lever 28 is engaged by a cam surface 32 at the forward extremity of the hub extension 29, swinging the lever out of locking position and permitting the wind-up shaft 21 and pick-up head 24 to be returned in a rearward direction by the spring 23. As will be understood, this occurs within one complete revolution of the pick-up head.

The pick-up head 24 is provided with a rearwardly extending cylindrical flange 33 which, in the retracted or rearward position of the pick-up head (see FIG. 7), has its rearward extremity behind or to the rear of the front wall 34 of the line spool. For convenience, this relationship may be described by referring to the cylindrical flange 33 of the pick-up head as being in generally surrounding relation to the line spool. Actually, the pick-up head has two distinct forward positions, the first being illustrated in FIG. 5 and the second being illustrated in FIG. 6. The "normal" forward position, illustrated in FIG. 5, is that position in which the pick-up head is held by the spring actuated lever 28. The second forward position is a "braking" position, in which the brake element 25 is pressed against the conical front surface of the cover member 11. In either of its forward positions and especially in its normal forward position, the pick-up head 24 is so located that the rear edge of its cylindrical flange 33 lies slightly ahead of the front wall 17 in the line spool, so that a line extending outward from the line spool and passing forward over the cylindrical flange of the pick-up head engages and turns forward about the outer edge of the line spool front wall 34. In the "normal" forward position of the pick-up head, the line extends forward and outward, from the front wall 34 of the spool to the rear edge of the pick-up head. The outward component is unavoidable because the pick-up head must be of slightly larger diameter than the line spool wall 34, and results, in a conventional reel, in a tendency for the line to be snagged by the pick-up head notches.

Advantageously, the front wall 34 of the line spool is provided with a forwardly extending cylindrical flange 35 underlying the cylindrical flange 33 of the pick-up head, in order to avoid or at least minimize any axial gap between the line spool and the pick-up head, which the line might accidentally enter and become fouled.

In accordance with the invention and as particularly illustrated in FIG. 3, for example, the cylindrical flange 33 in the pick-up head is provided with one or more notches 36 in its rearward edge, which notches are arranged to engage the line and wrap it upon the line spool 17 as the pick-up head is rotated, assuming the pick-up head to be in its rearward or FIG. 7 position. Unlike the construction of conventional closed face spinning reels, however, and specifically in accordance with the invention, the line-engaging surfaces 36a of the notches 36 are disposed at a substantial angle, relative to the longitudinal direction. As shown best in FIG. 3, the direction of the angle is such that the line-engaging surface 36a extends, starting from the apex of the notch, rearward and in a direction opposite to that in which the pick-up head rotates in winding line upon the spool.

The angle of the surface 36a which, for facility of description, may be referred to as a receding angle, is particularly advantageous in that it tends to make the notch self-clearing and thereby avoids accidental snagging of the line, as the line is drawn across and about the flange while being withdrawn from the reel. In this respect, it will be understood that the line passes over the notches during withdrawal. Moreover, since the line at that point is changing direction from a generally tangential to a generally longitudinal disposition, it tends to be drawn downward (in a radial direction) into the notches during payout under tension, or simply to enter the notches under its own weight when completely relaxed. In either case, the line normally would tend to snag in the notches; but this problem is effectively avoided in accordance with the invention by disposing the line-engaging surfaces of the notches at a substantial receding angle, as illustrated particularly in FIG. 3, so that the notches tend to be self-clearing.

Since the notches 36, because of their self-clearing characteristics, normally would tend to be inefficient or unreliable during wind-up, permitting the line occasionally to become disengaged, the structure of the invention includes a forwardly opening annular guide groove 37, which is formed in the forward portion of the frame plate 14 and receives the rearward edge extremitiese of the cylindrical flange 33 when the pick-up head 24 is in its retracted or rearward position. In further accordance with the invention, the depth to which the flange 33 is received within the guide groove 37 is less than the depth of the line-engaging notches 36, so that at least a small, line-encircling opening 39, defined by the leading edge 37' of the groove 37 and the notches 36, remains in the exposed portions of the cylindrical flange. The minimum line-encircling opening is, of course, sufficient to accommodate freely the line L. At the same time, however, the line is positively locked within the opening 39 for completely reliable wind-up without any chance of the line slipping out of the self-clearing notch, either under tension or during a moment of slack.

In a preferred embodiment of the new reel, illustrated in FIGS. 10–12, a pick-up head 40, similar in most aspects to the pick-up head 24, is provided. For convenience of description, those elements common to both embodiments will be given the same reference numerals. The pick-up head 40, however, includes a slightly modified and particularly advantageous arrangement of pick-up notches.

Specifically, pick-up notches 41 of the preferred embodiment are relatively large in number and are substantially symmetrical in configuration. For example, in a typical commercial embodiment of the reel, having a pick-up head of 2⅛ inches in diameter, there are 20 notches. Advantageously, and as shown, the receding angles described hereinabove are in the nature of a continuous and regular, repeating sinusoidal waveform. The "crests" 42 of the waveform are advantageously smoothly rounded and generally define a scalloped rear edge 44 of the cylindrical flange 33. The "troughs" 43 of the uniform waveform actually define the notches 41.

It should be understood that the notches 41 possess the attributes of the previously described notches 36, that is to say, they are completely self-clearing when in a forward position. Accordingly, for efficient and reliable line retrieval and when in the rearward position, the pick-up head 40 cooperates with the guide groove 37 in the same manner as the pick-up head 24 to define line-encircling openings 39. This relationship is shown clearly in FIG. 11, where it may be seen that the self-clearing notches 41 in combination with the guide groove 37 completely surround the line for positive and reliable wind-up.

By the unique expedient of providing a pick-up head having a large number of line engaging notches, any one of which will be randomly employed in a given line retrieval, wear may be greatly and evenly distributed among many notches over the life of the reel, rather than being concentrated solely in one or a few notches. Thus, the life of the pick-up head may be effectively extended or prolonged without resorting to a heat treatment or similar surface hardening treatment to accomplish that end.

In accordance with another aspect of the invention, the use of notches 41 having rounded profiles in a continuous, sinusoidal waveform presents a rear edge 44 having an absence of flat surfaces and eliminates any possible pinching between a flat surface and the groove 37. The nature of the waveform is such that it is "self-centering." Thus, each of the symmetrical and rounded crests 42 automatically centers the line into an adjacent notch 41, if the line should engage the rearmost edges of the flange rather than a notch 41 at the beginning of a line retrieving operation. Moreover, there is no "lost motion" at the commencement of line pick-up, since the pick-up notches are continuously arrayed. That is to say, the pick-up head need not be rotated any significant amount to bring a notch into engagement with a line.

In the forms of the reel specifically illustrated herein, the annular groove 37 advantageously is incorporated in a forwardly projecting cylindrical portion of the platelike reel frame 14, which mounts the entire reel mechanism. However, it will be understood that the guide groove may be located in another part, so long as, in the wind-up position of the pick-up head, the rearward extremity of the cylindrical flange 33 is received to a predetermined depth within the guide groove to form a line-encircling opening.

The structure of the invention, while extremely simplified in nature, represents a significant advance in the design of closed face spinning reels since it provides, for the first time, a practical and reliably operative mechanism utilizing a notched pick-up head. Thus, whereas notched pick-up heads have been proposed heretofore and have been known to be desirable because of their mechanical simplicity, the art has not heretofore developed a reliable and practical working embodiment of such a reel, since prior designs did not provide for self-clearing characteristics of the line-engaging notches, necessary for free payout, while at the same time providing for positive line engagement during wind-up through the use of a forwardly facing annular guide groove positioned to receive the rearward edge extremities of the pick-up head.

The construction of the invention is particularly desirable and advantageous for incorporation in closed face spinning reels, in which the cylindrical flange of the pick-up head forms a supporting surface about which the line travels, often in pressure contact. In such cases, the line tends to be drawn radially inward, into the open sides of the notches. This condition, in a conventional reel having reliable wind-up characteristics, would tend to cause snagging and discontinuity in the outward flow of line.

The reel of the invention, while extremely reliable and efficient in operation, is of such mechanical simplicity as to be capable of manufacture and distribution at an extremely low cost, relative to reels of similar capability.

Other aspects of the illustrated reel form the subject matter of and are covered by my application Serial No. 86,049, filed January 31, 1961, now United States Patent No. 3,105,651, the disclosure of which is considered as being incorporated herein by reference. Thus, while detailed description of certain aspects of the illustrated reel has been omitted herein to avoid unnecessary repetition, reference may be made to the United States Patent No. 3,105,651 for further descriptive details, regarding the construction and operation of other features of the reel.

It should be understood that the specific form of the reel herein illustrated and described is intended to be representative only, as certain changes may be made therein without departing from the clear teachings of the disclosure. Accordingly, reference should be made to the following appended claims in determining the full scope of the invention.

I claim:
1. A spinning type fishing reel assembly comprising
   (a) a normally non-rotatable line spool,
   (b) a pick-up head mounted forward of said line spool for rotational and axial movement and having a peripheral annular flange of predetermined thickness extending rearwardly,
   (c) means to retain said pick-up head in a first axial position in which said flange is forward of said line spool,
   (d) means to retain said pick-up head in a second axial position in which said flange surrounds a portion of said line spool, and
   (e) guide means surrounding a portion of said line spool and having a forwardly opening annular guide groove of predetermined width not substantially in excess of said predetermined thickness of and aligned with said peripheral flange,
   (f) rearward extremities of said flange being received circumferentially in said groove to a predetermined depth when said pick-up head is moved axially to and retained in said second position,
   (g) said flange having a rearwardly opening notch therein deeper than said predetermined depth for the passage of line when said pick-up head is in said second position, whereby said notch and said groove define a line-encircling opening in said second position,
   (h) said notch having a line engaging surface disposed at a substantial receding angle to the axis of the pick-up head.

2. The reel of claim 1, in which
   (a) said line spool is mounted on the front of a plate-like member, and
   (b) said guide means comprises a forwardly extending annular flange portion of said platelike member.

3. A spinning type fishing reel assembly comprising
   (a) a normally non-rotatable line spool,
   (b) a pick-up head mounted in front of said line spool for rotation about the axis thereof,
   (c) said pick-up head being movable axially and having a line-engaging rearward position and a retracted forward position, (d) said pick-up head having a rearwardly extending cylindrical wall of predetermined thickness arranged generally to surround said line spool when said pick-up head is in its line-engaging position,
(e) said cylindrical wall having a line-engaging notch of predetermined depth in the rearwardly facing edge thereof,
(f) said notch having a line-engaging surface disposed at a substantial receding angle to the axis of said pick-up head,
(g) means forming a forwardly facing annular groove of predetermined width not substantially in excess of said predetermined thickness of said wall and positioned to receive the rearward edge of said pick-up head when said head is in said line-engaging rearward position, and
(h) means limiting the projection of said wall into said groove to a distance less than the predetermined depth of said notch, whereby said groove and said notch define a line-encircling opening in said line-engaging position,
(i) said cylindrical wall forming a non-impedimentary surface over which the line may freely travel during its self-clearing, payout off the spool, when said pick-up head is in its forward retracted position.

4. A spinning type fishing reel assembly comprising
(a) a normally non-rotatable line spool,
(b) a pick-up head mounted forward of said line spool for rotational and axial movement and having a cylindrical peripheral flange extending rearwardly,
(c) means generally surrounding a portion of said line spool and having a forwardly opening annular guide groove aligned with said peripheral flange,
(d) rearward extremities of said flange being adapted to be received circumferentially in said groove to a predetermined depth when said pick-up head is moved axially to and retained in a predetermined line-retrieving position,
(e) said flange having a rearwardly opening notch therein deeper than said predetermined depth for the passage of line when said pick-up head is in said predetermined position,
(f) said notch having a pair of line-engaging surfaces disposed at a substantial receding angle to the axis of the pick-up head and cooperating with said groove to define a line-encircling opening in said line-retrieving position.

5. A spinning type fishing reel comprising
(a) a normally non-rotatable line spool,
(b) a pick-up head mounted in front of said line spool for rotation about the axis thereof,
(c) said pick-up head being movable axially and having a line-engaging rearward position and a retracted forward position,
(d) said pick-up head having a rearwardly extending wall arranged generally to surround said line spool when said pick-up head is in its line-engaging position,
(e) said wall having a continuous, substantially sinuous line-engaging surface of predetermined depth in the rearwardly facing edge thereof,
(f) means forming a forwardly facing annular groove positioned to receive the rearward edge of said pick-up head when said head is in line-engaging position, and
(g) means limiting the projection of said wall into said groove to a distance less than the predetermined depth of said line-engaging surface whereby said line-engaging surface and said groove define a plurality of line-encircling openings in said line-engaging position.

6. The reel of claim 5, in which
(a) said wall forms a self-clearing surface over which said line travels freely during its payout off the spool, when said pick-up head is in its forward, retracted position.

7. A spinning type fishing reel assembly comprising
(a) a normally non-rotatable line spool,
(b) a pick-up head mounted forward of said line spool for rotational movement and having a peripheral flange of predetermined thickness extending rearwardly,
(c) guide means surrounding a portion of said line spool and having a forwardly opening annular guide groove of predetermined width not substantially in excess of said predetermined thickness of and aligned with said peripheral flange, and
(d) means for controllably moving one of said pick-up head and guide means relatively between separated and closed positions,
(e) rearward extremities of said flange being received circumferentially in said groove to a predetermined depth when said pick-up head and guide means are moved relatively axially to and retained in said closed position,
(f) said flange having a rearwardly opening notch therein deeper than said predetermined depth for the passage of line when said pick-up head and guide means are in said closed position,
(g) said notch having a line-engaging surface disposed at a substantial receding angle to the axis of the pick-up head.

8. A spinning type fishing reel assembly, comprising
(a) a normally non-rotatable line spool,
(b) a pick-up head mounted forward of said line spool for rotational and axial movement and having a peripheral flange extending rearwardly,
(c) means to retain said pick-up head in a first axial position in which said flange is forward of said line spool,
(d) means to retain said pick-up member in a second axial position in which said flange surrounds a portion of said line spool, and
(e) guide means surrounding a portion of said line spool and having a forwardly opening annular guide groove aligned with said peripheral flange,
(f) rearward extremities of said flange having continuously scalloped edges defining a plurality of notches therein,
(g) said rearward extremities being received circumferentially in said groove to a predetermined depth leaving portions of said notches partially exposed when said pick-up head is moved axially to and retained in said second position,
(h) whereby said partially exposed portions of said notches and said groove define line-encircling openings in said second position.

9. The reel of claim 8, in which
(a) said scalloped edge is sinuous in configuration, and
(b) said notches have a line engaging surface disposed at a substantial receding angle to the axis of the pick-up head.

10. A spinning type fishing reel assembly, comprising
(a) a normally non-rotatable line spool,
(b) a pick-up head mounted forward of said line spool for rotational and axial movement and having a cylindrical peripheral flange extending rearwardly,
(c) rearward extremities of said flange defining a continuous, symmetrical waveform having crest portions and trough portions,
(d) said crest portions being rounded and comprising the rearmost edges of said pick-up head,
(e) said trough portions comprising pick-up notches,
(f) means to retain said pick-up head in a first axial position in which said flange is forward of said line spool,
(g) means to retain said pick-up head in a second axial position in which said flange surrounds a portion of said line spool, and (h) guide means surrounding a portion of said line spool and having a forwardly opening annular guide groove aligned with said peripheral flange,
(i) said rearward extremities being received circumferentially in said groove to a predetermined depth leaving portions of said notches partially exposed when said pick-up head is moved axially to and retained in said second position,
(j) whereby said portions of said notches and said groove define line encircling openings in said second position.

11. The fishing reel assembly of claim 10, in which
(a) said trough portions include line engaging surfaces exposed at substantial receding angles to the axis of the pick-up head.

References Cited by the Examiner

UNITED STATES PATENTS

| | | | |
|---|---|---|---|
| 2,584,020 | 1/1952 | Humphreys | 242—84.2 X |
| 2,602,603 | 7/1952 | Blissit | 242—84.2 |
| 2,627,383 | 2/1953 | Tibbetts | 242—84.2 |
| 3,006,573 | 10/1961 | Holahan | 242—84.2 |
| 3,020,666 | 2/1962 | Hull | 242—84.21 X |
| 3,061,230 | 10/1962 | Gayle | 242—84.2 |
| 3,105,650 | 10/1963 | Kuether | 242—84.2 |

FOREIGN PATENTS 1,110,429  10/1955  France.

MERVIN STEIN, *Primary Examiner.*

B. S. TAYLOR, *Assistant Examiner.*